(12) United States Patent
Kim

(10) Patent No.: US 6,527,458 B2
(45) Date of Patent: Mar. 4, 2003

(54) COMPACT OPTICAL TRANSCEIVER INTEGRATED MODULE USING SILICON OPTICAL BENCH

(75) Inventor: Han-Saeng Kim, Kyonggi-do (KR)

(73) Assignee: Samsung Electronics Co., LTD, Suwon (KR)

( * ) Notice: Subject to any disclaimer, the term of this patent is extended or adjusted under 35 U.S.C. 154(b) by 0 days.

(21) Appl. No.: 09/777,082

(22) Filed: Feb. 5, 2001

(65) Prior Publication Data

US 2001/0012767 A1 Aug. 9, 2001

(30) Foreign Application Priority Data

Feb. 3, 2000 (KR) .......................................... 2000-5488

(51) Int. Cl.[7] .............................. G02B 6/36; H04B 10/12
(52) U.S. Cl. ............................ 385/89; 385/92; 359/152; 359/163
(58) Field of Search ......................... 385/88–94, 154, 385/163; 359/152–153, 154, 163

(56) References Cited

U.S. PATENT DOCUMENTS

| | | | | |
|---|---|---|---|---|
| 4,737,008 A | * | 4/1988 | Ohyama et al. ............ 350/96.2 |
| 5,002,357 A | * | 3/1991 | Newell ........................ 350/96.2 |
| 5,852,696 A | * | 12/1998 | Collins et al. ................. 385/88 |
| 6,213,651 B1 | * | 4/2001 | Jiang et al. ..................... 385/92 |
| 6,328,484 B1 | * | 12/2001 | Uebbing ........................ 385/93 |
| 6,374,021 B1 | * | 4/2002 | Nakanishi et al. ............. 385/49 |

* cited by examiner

Primary Examiner—Akm E. Ullah
Assistant Examiner—Jerry T Rahll
(74) Attorney, Agent, or Firm—Steve Cha; Cha & Reiter

(57) ABSTRACT

A compact optical transceiver, integrated module using a silicon optical bench is provided. The module comprises a silicon optical bench having a laser diode subassembly and a photodetector subassembly integrated thereto, the laser diode subassembly including an optical signal transmitting laser diode, and the photodetector subassembly including an optical signal receiving photodetector; a PCB circuit board for installing the silicon optical bench, which is provided with a laser diode subassembly driving circuit and a photodetector subassembly driving circuit, wherein the laser diode subassembly driving circuit applies an electrical signal to the laser diode subassembly to drive the same, so that the optical signal is generated from the electric signal, and wherein the photodetector subassembly driving circuit converts the optical signal received by the photodetector into the electric signal; and, a plastic package for sealing the PCB circuit board by wrapping a cover so that the PCB circuit board may be shielded off from the outside.

7 Claims, 8 Drawing Sheets

COMPACT OPTICAL TRANSCEIVER INTEGRATED MODULE USING SILICON OPTICAL BENCH

BACKGROUND OF THE INVENTION

1. Field of the Invention

The invention relates to an optical communication device, and more particularly to a compact optical transceiver integrated module.

2. Description of the Related Art

A laser module with a beam wavelength of about 1.3 μm which is used for a subscriber terminal of a broad-band optical communication network, is required to have a transmission rate of about 155 Mbps. This type of laser module is widely utilized in a terminal system, i.e., the broad-band network and the optical cable TV system, etc. An optical transmitter module converts an electric input signal to an optical signal of 1.3 μm wavelength, whereas an optical receiver module converts an optical signal to an electrical signal.

The optical transmitter module of 1.3 μm beam wavelength modulates light emitted from the front section of a laser diode into an electric signal and then connects the modulated electric signal to an optical fiber. The connected light or signal is transferred through the optical fiber, and the light transmitted along the optical fiber is converted back to electrical signal at the other end of the optical receiver module.

In general, the above optical transmitter and receiver modules are integrated in a packaging arrangement with at least 20 pins, and connectors are fabricated to be fitted as receptacles in use thereof. Most packaging arrangements used today includes at least 20 pins that are fabricated with metal metals, thus each of the 20 pins needs a complete electric isolation from the optical subassembly. Hence, the manufacturing process becomes very complicated. As the metal packaging arrangement is costly, a plastic packaging has been developed lately to reduce the production cost. In addition, as most optical transmitter and receiver modules being used today have optical fibers attached thereto thus making them inconvenient during the handling process, receptacle type optical transmitter modules without the optical fibers are gaining interest.

A compact packaging arrangement, which has been proposed in the early 1998, is about half size of the previously used optical transceiver integrated module, thus can be mounted with two times of integrity in the same area. Moreover, the compact packaging arrangement has advantages in that it can be applied to various types of connectors, such as MT-RJ connector, LC connector, etc.

A laser diode, which converts an electric signal into an optical signal and a photodiode, which converts an optical signal into an electric signal, are typically assembled using a metal packaging arrangement known as "TO-can." There are disadvantages associated with the "TO-can" in that the fabrication process is expensive as the cost of the metal packaging tends to be high. Also, the process time for connecting the metal packaging and the optical fiber tends to be long. Furthermore, a very expensive laser welding equipment has to be used when using the "TO-can."

Current optical transceiver integrated module uses a receptacle type packaging with 9 pins, and the laser diode and photodiode are contained within the metal package of the "TO-can." Thus, a cap welder application is required to fabricate the "TO-can" packaging arrangement. However, the laser welder application is very costly, thus the cost of the optical transceiver is expensive.

The space from one section connected via a connector to another section for transmitting and receiving the optical signal is 0.75 mm in the MY-RJ package and 6.35 mm in the LC package, as specified in the standard. However, the space cannot be constructed by aligning the TO-can itself in parallel form. To this end, a specifically structured optic device is further required to reduce the light path between the TO-can and the connector.

As shown in FIG. 1, one illustrative example of arrangement for packaging optical communication arrangement includes a lens 11 and mirrors 12 and 13 used for reducing the light path. Here, a special technique is required to form the mirrors 12 and 13. Due to the construction of the resin optics 10, the single mode transmission is impossible since the coupling of the light with single mode optical fiber is a difficult task. Therefore, the optics 10, as shown in FIG. 1, cannot be used for a long distance communication but can be used only for a short distance communication using multi-mode optical fibers.

SUMMARY OF THE INVENTION

It is, therefore, an object of the invention to provide a technique for manufacturing a compact optical transceiver integrated module using a silicon optical bench, in which a novel plastic packaging arrangement is provided, instead of a metal package, using a silicon optical benching technique applied to manufacture the novel optical transceiver module; as a result, the packaging size is reduced to half when compared to the previous optical transceiver module and a simple process can be performed without using the expensive metal package or other devices, and an MT-RJ or LC connector complying with international standard can be used.

According to one aspect of the present invention, the compact module includes a silicon optical bench having a laser diode subassembly and a photodetector subassembly integrated thereto, the laser diode subassembly including an optical signal transmitting laser diode, the the photodetector subassembly including an optical signal receiving photodetector;

a PCB circuit board for installing the silicon optical bench, the circuit board provided with a laser diode subassembly driving circuit and a photodetector subassembly driving circuit, the laser diode subassembly driving circuit applies an electrical signal to the laser diode subassembly to drive the same so that the optical signal is generated from the electric signal, and wherein the photodetector subassembly driving circuit converts the optical signal received by the photodetector into the electrical signal; and, a plastic package for sealing the PCB circuit board so that the PCB circuit board may be isolated.

According to another aspect of the invention, the laser diode subassembly and photodetector subassembly are applied with a silicon gel, which is applied with an encapsulating agent to effectively prevent a moisture absorption from the outside, whereby active components provided on the silicon optical bench can be protected from an external environment change.

According to another aspect of the invention, the silicon optical bench is connected to an RJ-45 connector using a 2-core ferrule and the core distance of the optical fibers in the core ferrule is 0.75 mm.

According to another aspect of the invention, the silicon optical bench is connected to an RJ-45 connector using a set of an optical fiber/ferrule/sleeve arrangement and the core distance of the optical fibers is 6.35 mm.

According to another aspect of the invention, the laser diode mounted on the silicon optical bench and the optical fiber connected to the photodetector are manually aligned.

According to another aspect of the invention, the cover is composed of plastic.

According to another aspect of the invention, the compact module further includes a shielding case for shielding a pre-amplifier of the photodetector subassembly driving circuit and the receiver photodetector from an external EMI (Electro-Magnetic Interference), the shielding case being fixed to the PCB in the periphery of the pre-amplifier of the photodetector subassembly driving circuit and the receiver photodetector.

According to another aspect of the invention, the shielding case is provided with a double layer structure.

DETAILED DESCRIPTION OF THE PREFERRED EMBODIMENTS

Hereinafter, a compact optical transceiver integrated module using the silicon optical bench according to the present invention will be described in detail in reference to the appended drawings.

In the compact transceiver using the silicon optical bench in accordance with the invention, a plastic packaging is manufactured in the shape of a receptacle without using an optical fiber. A laser diode or photodetector subassembly using a silicon optical bench is manufactured and mounted within the package. The laser diode converts an electrical signal into an optical signal, and the photodiode converts an optical signal into an electrical signal.

According to an embodiment of the present invention, an optical transceiver module is provided by integrating the optical transmitter and receiver into one module. The plastic package reduced in the overall size to be suitable for the specification of a small package is manufactured into a novel optical transceiver module using a ferrule or 2-core ferrule fixed on the SiOB. Accordingly, the inventive package can be reduced half in size compared to the prior optical transceiver modules, thus can be mounted with the integrity of 2 times of the prior modules in the same area. Advantageously, various types of connectors, such as the MT-RJ connector or the LC connector which are currently developed, can be applied to the inventive package.

Figure 1:
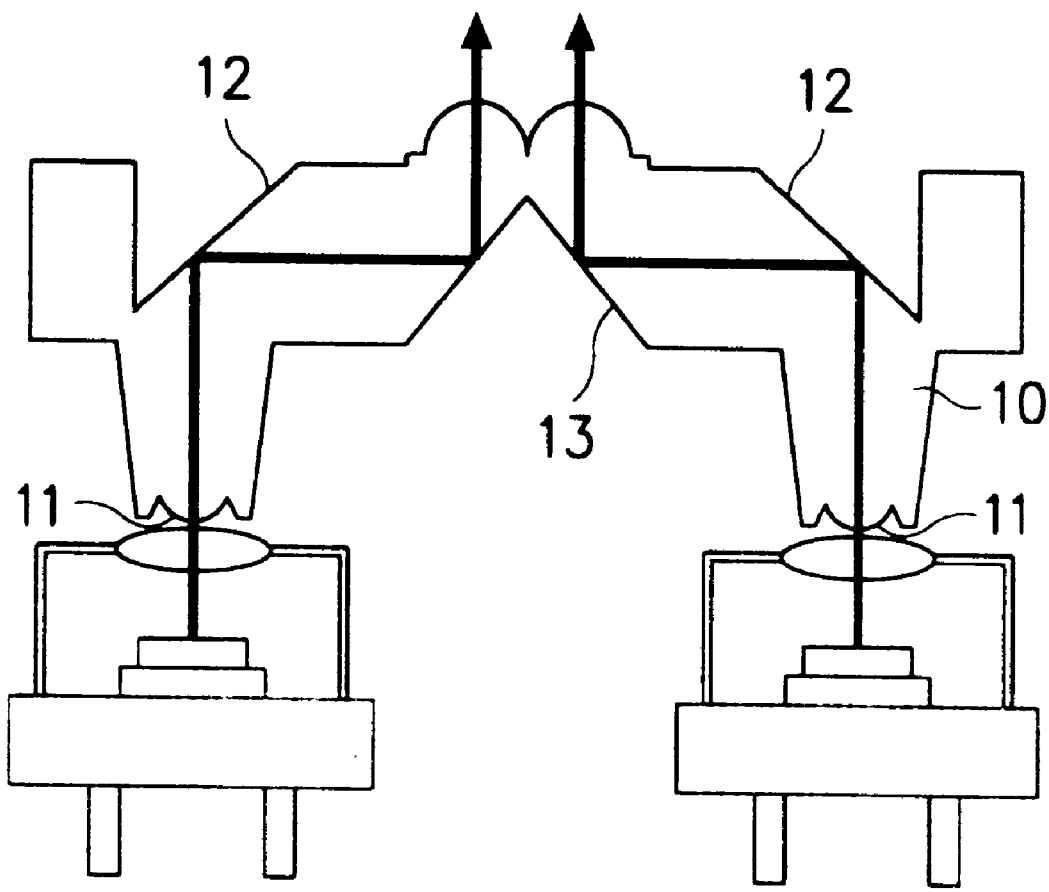
FIG. 1 is a schematic sectional view for showing the structure of an optical transceiver module of the related art.
Figure 2:
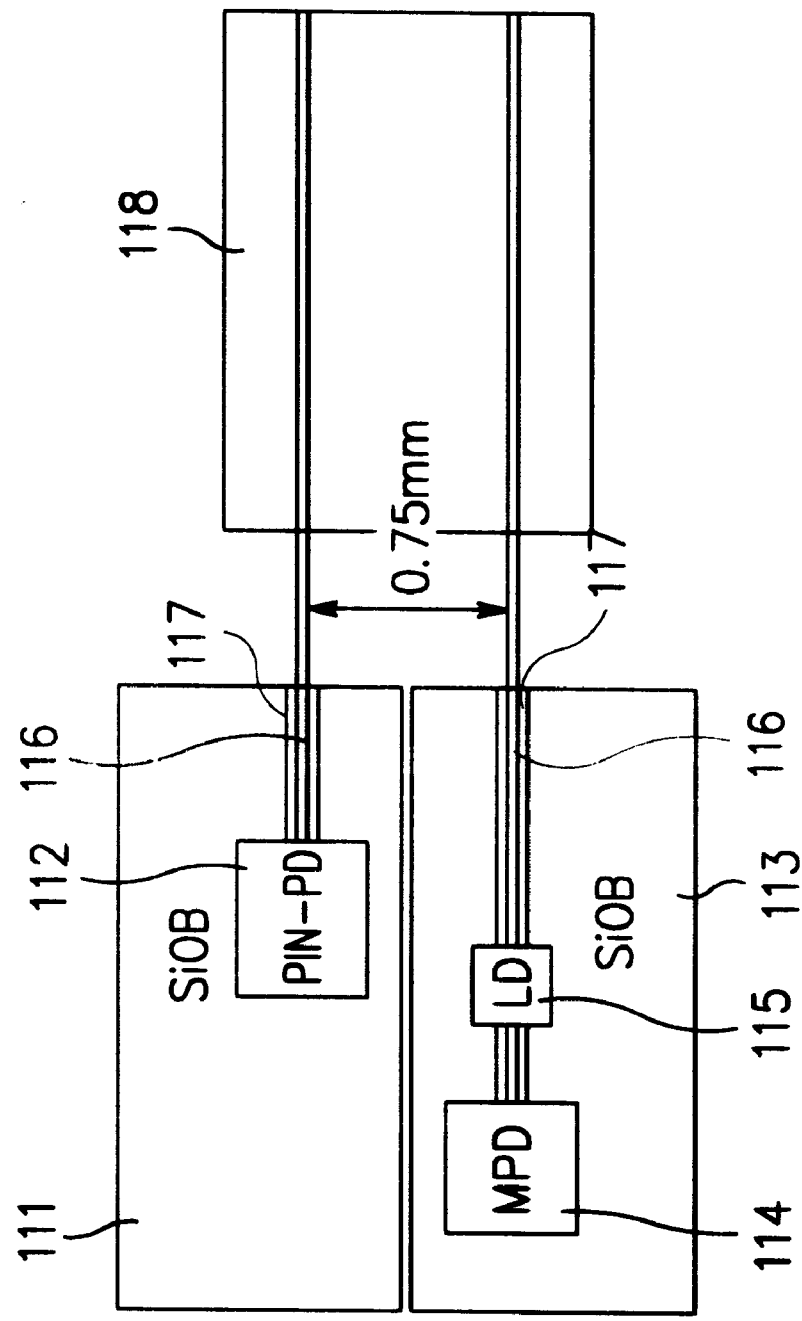
FIG. 2 is a schematic view for showing the structure of a silicon optical bench formed with a laser diode/photodetector subassembly applicable to an RJ-45 package in a compact transceiver module using a silicon optical bench according to the present invention.
Figure 3:
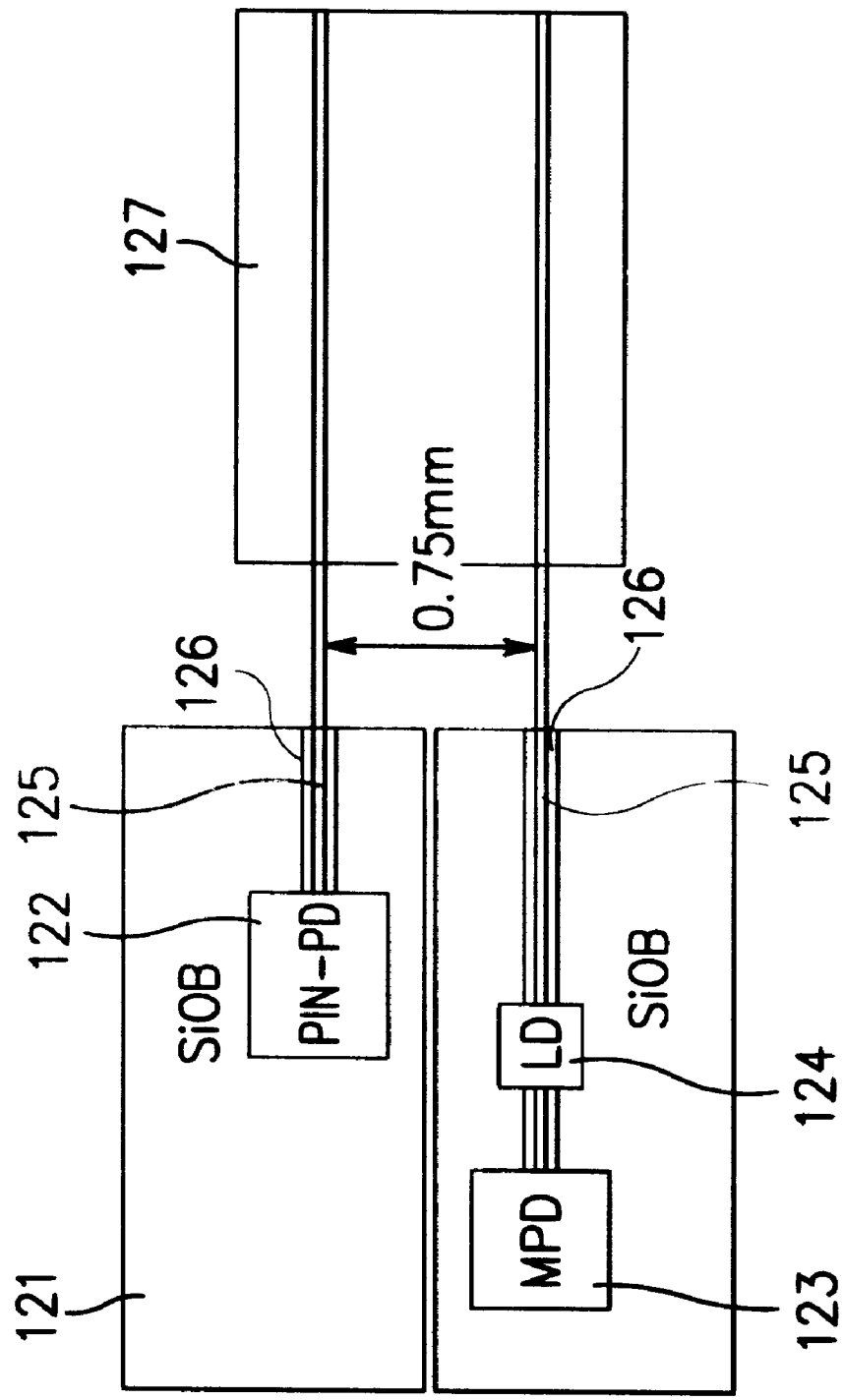
FIG. 3 is a schematic view for showing the structure of a silicon optical bench formed with another laser diode/photodetector subassembly applicable to an RJ-45 package in a compact transceiver integrated module using a silicon optical bench according to the present invention.
Figure 4:
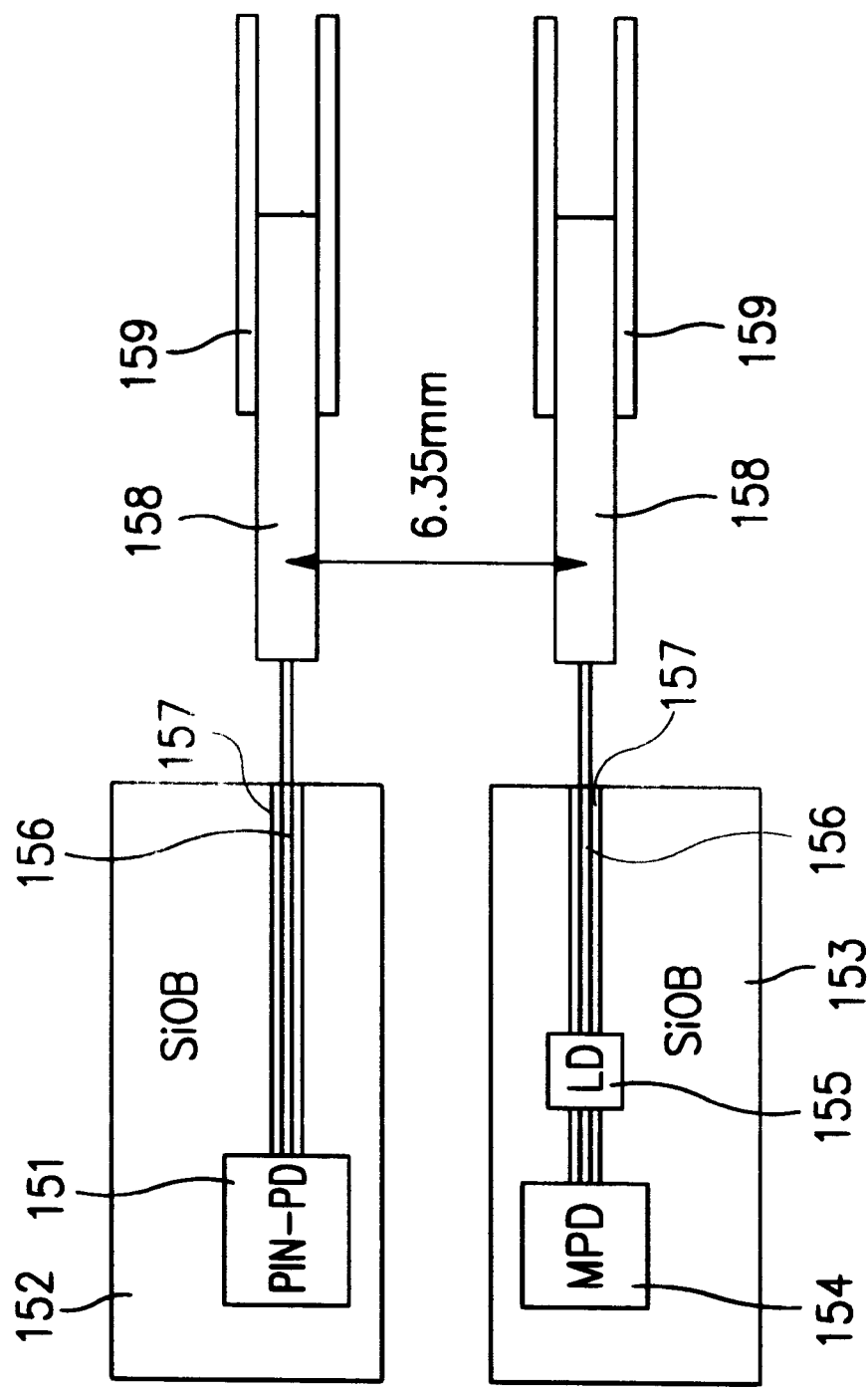
FIG. 4 is a schematic view for showing the structure of a silicon optical bench formed with an laser diode/photodetector subassembly applicable to an LC package in a compact transceiver module using a silicon optical bench according to the present invention.

Unlike the prior optical integrated modules, the inventive package has a shorter distance between the transmitting section and the receiving section in the MT-RJ and LC packages. Referring to FIGS. 2 and 3, in order to manufacture a package suitable for the RJ-45 package, 2-core ferrules 118 and 127 are manufactured in a way so that the distance between the two cores of single mode optical fibers to be 750 $\mu$m. Referring to FIG. 4, in order to manufacture the LC package, the optical fiber/ferrule/sleeve set 156, 158 ad 159 is manufactured by fixing the single mode optical fibers 156 to the ceramic ferrules 158.

Figure 5A:
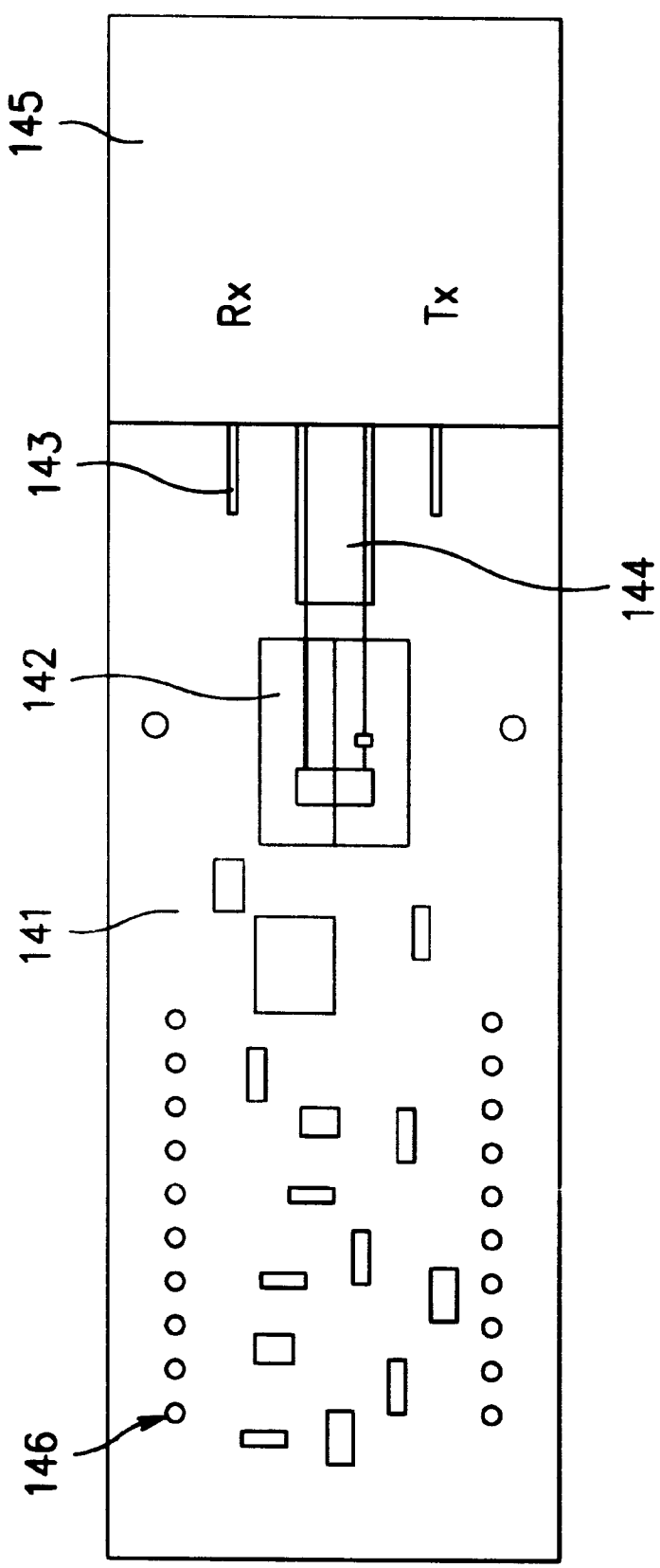
FIG. 5A and FIG. 5B are schematic views for showing the structures of a compact transceiver module using a silicon optical bench according to the present invention which can be applied to the RJ-45 package mounted with the silicon optical bench shown in FIG. 2; and, FIG. 6A and FIG. 6B are schematic views for showing the structures of a small form factor optical transceiver integrated module using a silicon optical bench according to the invention which can be applied to the LC package mounted with the silicon optical bench shown in FIG. 4.

The 2-core ferrules 118 and 127 having the distance of 750 $\mu$m between its internal cores are prepared without separately procuring the two sets of fibers and ferrules respectively since the respective cores of the single mode optical fibers 116 and 125 have a very small distance of 750 $\mu$m therebetween. Referring to FIG. 5A, the 2-core ferrule are provided with holes 143 where two guide pins of the MT-RJ connectors can be inserted. Similarly, two sets of the optical fiber/ferrule/sleeve 156, 158 and 159, as shown in FIG. 4, are separately manufactured. As the size of the connecting section is smaller than that of the prior art system, an MU ferrule is used to manufacture the optical fiber/ferrule/sleeve sets 156, 158 and 159.

Referring to FIGS. 2, 3 and 4, in the laser diode subassembly for the optical transceiver according to the present invention, the laser diodes 115, 124 and 155 are bonded onto the silicon optical bench utilizing "flip-chip" technology, which removes the need for any wire bond attachments, and solder bump self-alignment technology. The optical fibers 116, 125 and 156 are manually aligned with the laser diode using the respective V-shaped grooves 117, 126 and 157 formed on the SiOB silicon and reliably fixed by using an ultraviolet epoxy.

Similarly, in the PD or photodetector subassembly of the optical transceiver according to the present invention, the receiver photodetectors 112, 122 and 151 are bonded on the SiOB utilizing the "flip-chip" bonding and solder bump technologies. The optical fibers 116, 125 and 156 are manually aligned with the receiver photodiode and reliably fixed thereto using the ultraviolet epoxy. To this end, the optical fibers 116, 125 and 156 are guided by the respective V-shaped grooves 117, 126 and 157 that are defined precisely on the SiOB. Accordingly, the optical fibers 116, 125 and 156 can be manually aligned, thereby the use of expensive aligning equipment required in the prior art system is unwarranted. In addition, both the optical transmitter and receiver are inserted into a plastic package covered by a plastic cover, thus the cost of the package is reduced and the cost competitiveness utilizing the present invention is enhanced.

Figure 5B:
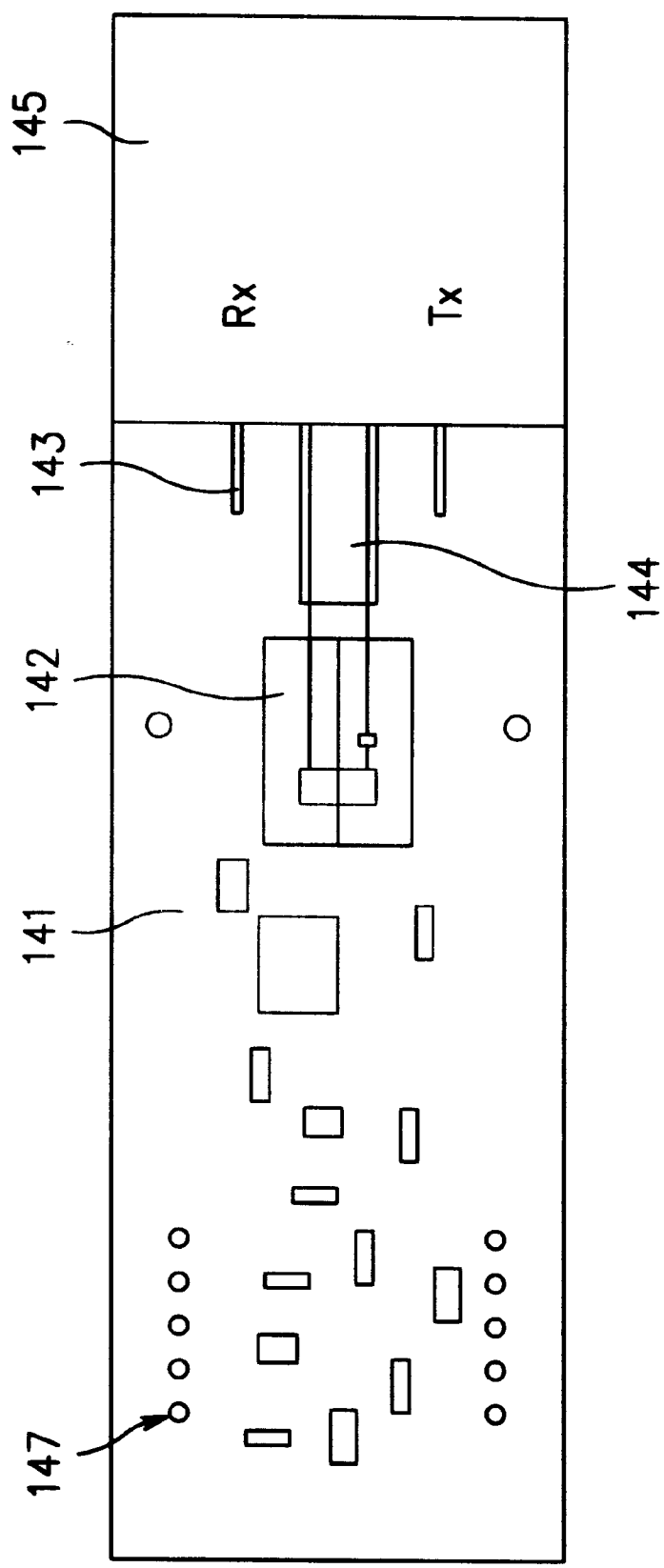

In practice, in the laser diode/photodetector subassembly for the RJ-45 package, the PCB 141 is fixed to the RJ-45, and the 2-core ferrule 144 is mounted on the PCB 141, where the cover composed of plastic is wrapped for fixing, so that the optical transceiver integrated module using the RJ-45 package is manufactured as shown in FIG. 5A and FIG. 5B. Namely, the reference numeral 141 represents the PCB having 2×10 pins, 143 represents the holes for the guide pins, 145 represents connecting sections for the MT-RJ connector, 146 represents pins, and 147 represents a 2×5 pin PCB.

Figure 6A:
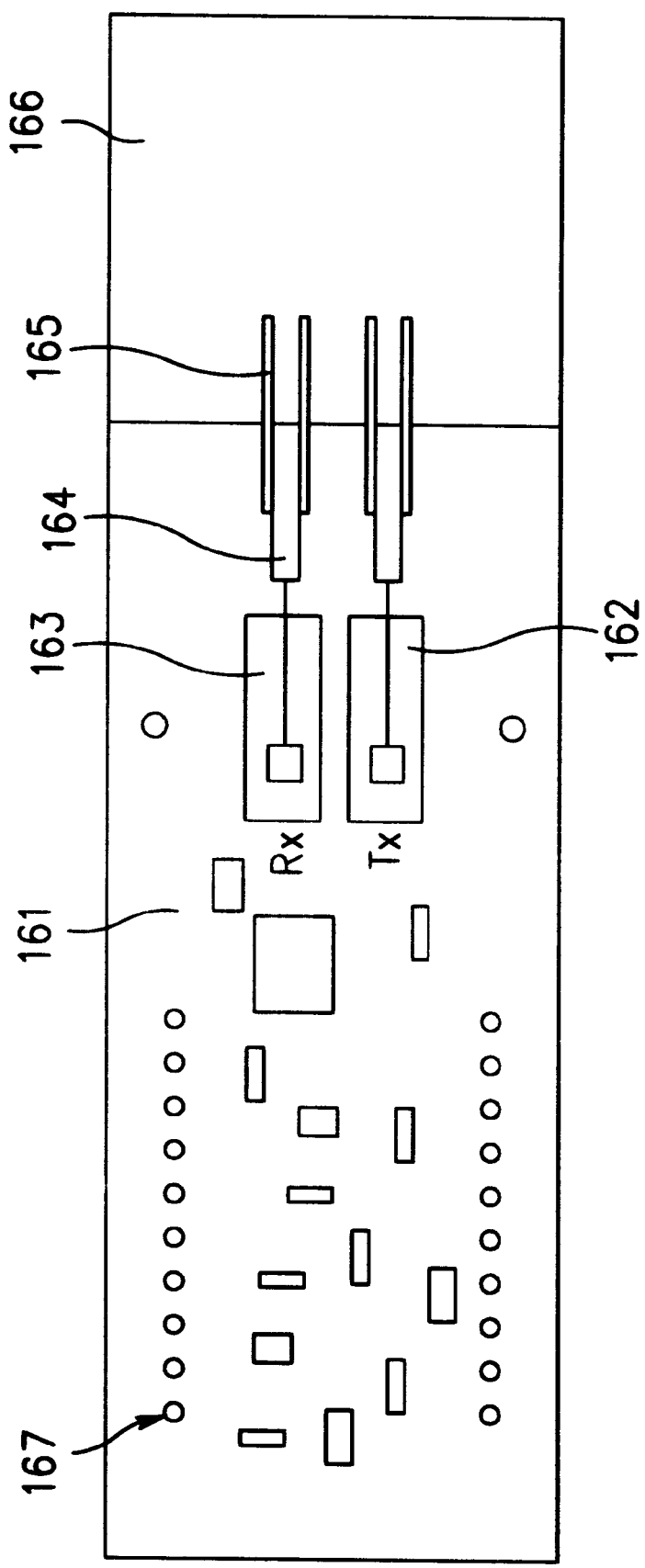
Figure 6B:
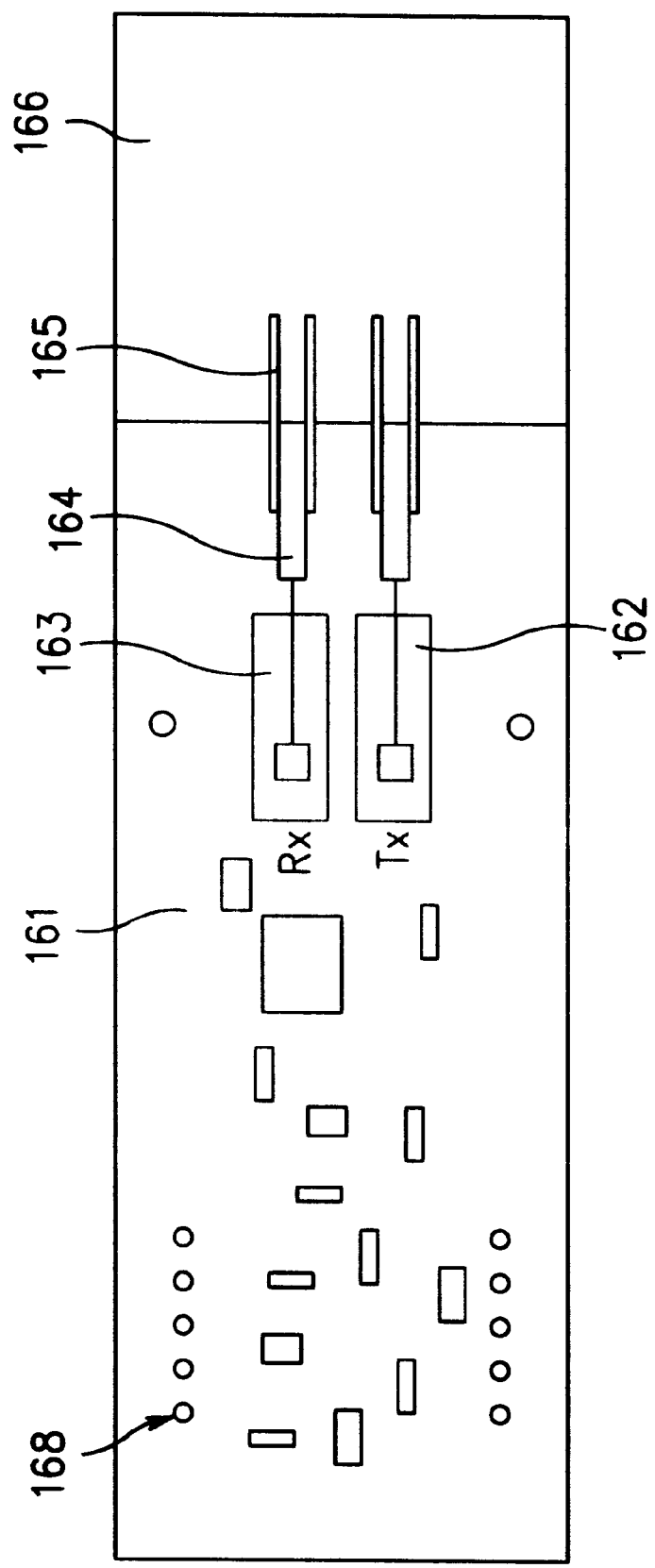

Similarly, in the laser diode/photodetector subassembly for the LC package, the PCB is fixed to the LC type plastic package, and the optical fiber/ferrule/sleeve set which is connected to the SiOB is inputted into a plastic ferrule holder and then mounted on the PCB, where the plastic cover is wrapped for fixing, so that the optical transceiver integrated module using the LC package is manufacture as shown in FIG. 6A and FIG. 6B. Here, the reference numeral 161 represents a 2×10 pin PCB, 162 represents a transmitter silicon optical bench, 163 represents a receiver silicon optical bench, 164 represents ferrules, 165 represents sleeves, 166 represents connecting sections for the LC connector, 167 represents pins, and 168 represents a 2×5 pin PCB.

In the process for manufacturing the optical transceiver, integrated module using one of these RJ-45 plastic package and LC plastic package, the PCB parts in the periphery of a pre-amplifier and the receiver photodiodes 112, 122 and 152, which sensitively reacts to the external EMI(Electro-Magnetic Interference), are covered with a specially designed double shielding case that covers the pre-amplifier and the photodetector subassembly by way of fixing to the PCB so that active components can be protected from the external EMI.

So as to be operated in the temperature range of −40 to 85° C., the optical transceiver module manufactured as above should be sealed hermetically. Since a hermetic sealing is not provided by the plastic package, a silicon gel is applied on the laser diode subassembly and the photodetector subassembly to provide the hermetic sealing, then an encapsulant is applied on the silicon gel to prevent an external moisture absorption thereby protecting the active components from the external environment.

As can seen above, the inventive optical transceiver using the silicon optical bench is manufactured by adopting the plastic package instead of the metal package. It involves manually aligning the optical fibers and uses the 2-core ferrule for the RJ-45 package and the optical fiber/ferrule/sleeve set for the LC package.

In the optical transmitter section of the inventive optical transceiver integrated module using the silicon optical fiber, the laser diode converts the electric signal into the optical signal and sends the optical signal to the outside via the optical fiber, and the light having weak intensity from the rear of the laser diode is detected by a monitor photodiode 123 arranged in the rear of the laser diode, so that the optical intensity from the front of the laser diode is adjusted by a return circuit. In the optical receiver section, the receiver photodiode converts the external optical signal transferred via the optical fiber to the electric signal.

In the inventive optical transceiver integrated module using the silicon optical bench, the novel plastic package is utilized instead of the metal package. The silicon optical benching technique is applied to manufacture the novel optical transceiver integrated module, which is reduced half in size compared to the previous optical transceiver module, so that a simpler process can be performed without using the expensive metal package or equipment, and also the MT-RJ or LC connector which is international standard can be used.

Accordingly, the compact optical transceiver integrated module manufactured by using the silicon optical bench according to the present invention which includes the plastic package, 2-core ferrule, and the optical fiber/ferrule/sleeve set, has advantages as follows:

First, the optical fibers can be manually aligned by using the V-shaped grooves defined in the SiOB so that the process can be simplified and performed without using any costly equipment.

Second, additional optics or package material are unnecessary and the SiOB of cheap silicon material and plastic package available for mass production can be used so that the manufacturing can be performed at a relatively low cost and thus the overall cost of the module can be reduced.

Third, the 2-core ferrule is used with the inter core distance of 750 µm making any special optics unnecessary so that the process can be simplified and the production cost is more economical and thus the module cost can reduced.

Fourth, the optical fiber/ferrule/sleeve set is used without requiring a special optics so that the process is simplified and the production cost is cheap and thus the module cost can be reduced.

Fifth, the silicon gel and encapsulant can be applied on the part where the photodiode and laser diode are arranged, so that the components can be protected from the external environment.

Sixth, a single mode optical fiber is used for direct coupling to the SiOB, thus allowing applications to multi-mode and single mode as well both short and long distance communication.

Seventh, the SiOB can be adapted via the same process to the LC package and RJ package so that active correspondence can be carried out to any package.

Finally, the techniques of the present invention are also suitable to other optical package arrangements including, but not limited to, packages for single optical devices, packages for an array of optical devices.

What is claimed is:

1. A compact optical transceiver module, comprising:

a silicon optical bench having a laser diode subassembly and a photodetector subassembly integrated thereto, said laser diode subassembly including an optical signal transmitting laser diode, and said photodetector subassembly including an optical signal receiving photodetector;

said silicon optical bench further including at least one pair of V-grooves for aligning an optical fiber to said laser diode assembly and said photodetector subassembly;

a PCB circuit board for installing said silicon optical bench, said circuit board provided with a laser diode subassembly driving circuit and a photodetector subassembly driving circuit, said laser diode subassembly driving circuit applies an electrical signal to said laser diode subassembly to drive the same so that the optical signal is generated from the electric signal, and wherein said photodetector subassembly driving circuit converts the optical signal received by said photodetector into the electrical signal; and, a plastic package for sealing said PCB circuit board so that said PCB circuit board may be isolated.

2. The compact module of claim 1, wherein said laser diode subassembly and said photodetector subassembly are applied with a silicon gel, which is applied with an encapsulating agent to effectively prevent a moisture absorption from the outside, whereby active components provided on said silicon optical bench can be protected from an external environment change.

3. The compact module of claim 1, wherein said silicon optical bench is connected to an RJ-45 connector using a 2-core ferrule and the core distance of the optical fibers in said core ferrule is 0.75 mm.

4. The compact module of claim 1, wherein said silicon optical bench is connected to an RJ-45 connector using a set of an optical fiber/ferrule/sleeve arrangement and the core distance of the optical fibers is 6.35 mm.

5. The compact module of claim 1, wherein said laser diode mounted on said silicon optical bench and the optical fiber connected to said photodetector are manually aligned.

6. The compact module of claim 1, further comprising a shielding case for shielding a pre-amplifier of said photodetector subassembly driving circuit and said receiver photodetector from an external EMI (Electro-Magnetic Interference), said shielding case being fixed to the PCB in the periphery of said pre-amplifier of said photodetector subassembly driving circuit and said receiver photodetector.

7. The compact module of claim 6, wherein said shielding case is provided with a double layer structure.

* * * * *